United States Patent Office 2,911,314
Patented Nov. 3, 1959

2,911,314

COLORATION OF SYNTHETIC POLYMERIC MATERIAL

William H. Armento and Nikolaus Hebauf, Albany, N.Y., assignors to General Aniline & Film Corporation, New York, N.Y., a corporation of Delaware No Drawing. Application December 17, 1954
Serial No. 476,093

9 Claims. (Cl. 106—168)

This invention relates to coloration of synthetic polymeric material and more particularly to the use therefor of dyestuffs of the formula

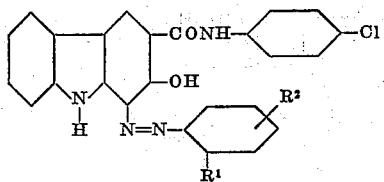

wherein $R^1$ and $R^2$ are selected from the group consisting of $Cl$, $CH_3$, $OCH_3$, $NO_2$ and $SO_2N(C_2H_5)_2$.

It is an object of this invention to provide synthetic polymeric material colored in brown shades of superior light fastness properties. Other objects and advantages will appear as the description proceeds.

The attainment of the above objects is made possible by the use of dyestuffs of the above formula for the coloration of synthetic polymeric material. These dyestuffs have been found to meet the long-felt need for a good brown pigment with excellent light fastness properties when employed for the coloration of synthetic polymeric material.

The dyestuffs of the above formula may be produced in well known manner by diazotizing an aromatic amine of the formula

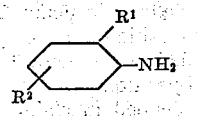

$R^1$ and $R^2$ having the values given above, and coupling the diazotized compound with 2-hydroxy-3-carbazole-carboxylic acid p-chloroanilide of the formula

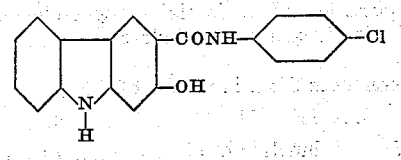

otherwise known as Naphthol AS–LB. Among the aforementioned aromatic amines useful as diazo components in the production of the instant pigments, those wherein $R^2$ is $Cl$ in the 5-position and $R^1$ is $Cl$, $CH_3$ or $OCH_3$ in the 2-position have been found to yield exceptional results in light fastness properties, as indicated by resistance to change in shades when exposed up to 117 hours in the Fadeometer. These preferred aromatic amines have the following formulae:

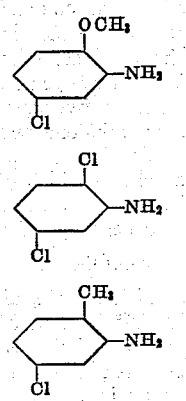

As examples of other aromatic amines which may be employed, there may be mentioned 3-chloro-2-methylaniline, 4-chloro-2-methylaniline, 2-nitro-4-methylaniline, 5-nitro-2-methoxyaniline, 5-(N-diethyl sulfamyl)-2-methoxyaniline, and the like.

The synthetic polymeric material which may be colored in accordance with this invention may have a basis of regenerated cellulose which may be made by the viscose or cuprammonium process, nitrocellulose, polyacrylonitrile, polymethacrylic acid and derivatives, polyvinyl chloride, polyvinyl acetate, polyvinyl cyanide, polyethylene, polystyrene, polyesters such as poly(ethyleneterephthalate), polyurethanes and polyamides such as nylon, or mixtures and copolymers thereof. Most advantageously, however, the synthetic polymeric material may have a basis of an organic derivative of cellulose such as an organic acid ester of cellulose or a cellulose ether such as cellulose acetate, cellulose propionate, cellulose butyrate, or mixed esters thereof, ethyl cellulose, benzyl cellulose, and the like.

The preferred mode of operation in accordance with this invention involves incorporation of the pigment into a solution of the synthetic polymeric material or into a hot melt thereof, in proportions ranging from about 0.5 to 3 percent or more by weight of the polymeric material dependent upon the particular material and dyestuff employed, the opacity and the depth of shade desired and the like. The resulting solution or suspension of pigment in synthetic polymeric material may then be employed as a coating composition or for the production of foils, films, filaments, fibers and other shaped objects colored in improved light fast brown shades, by extrusion, casting, molding, dipping, pouring or otherwise shaping the said solution or suspension.

Alternatively, the instant dyestuffs may be mixed with a suitable organic liquid (e.g. xylenes, banana oil, ethyl acetate, butyl acetate and the like, and mixtures thereof) and the resulting mixture may be employed for coloring shaped products having a basis of synthetic polymeric material by contact therewith as by immersion, padding, spraying, spreading or the like.

When dispersed in organic solvent solutions or hot melts of synthetic polymeric material preparatory to the formation of coating or impregnating compositions or shaped colored products therefrom, the dyestuffs of this invention are preferably added in the form of a substantially 100% powder or slurry in an appropriate liquid such as used in cellulose acetate extrusion. However, in some instances, particularly when coloring shaped products having a basis of synthetic polymeric material by treatment with solutions or suspensions of the instant dyestuffs, or when the dyestuff is to be dispersed in an aqueous synthetic polymeric spinning or casting solution such as viscose or the like, admixture with the dyestuff of up to 50 or 60 percent by weight of a finely divided surface active agent is desirable. Such admixture aids in the production of a soft product in addition to assisting in subsequent dispersing and coloring operations. As such surfactants, there may be mentioned polyoxyethylated higher fatty alcohols and acids, and other non-ionic polyoxyethylated surface active agents derived from compounds containing a reactive hydrogen atom, sulfonates such as formaldehyde-naphthalene-sulfonic acid condensates, and the like.

The following examples, in which parts are by weight unless otherwise indicated are illustrative of the instant invention and are not to be regarded as limitative.

Example 1

15.75 g. 5-chloro-o-anisidine was dissolved in 150 cc. water and 30 cc. HCl (20° Bé.) at 80° C. After cooling to 0° C., 6.9 g. sodium nitrite as a 31.5% solution was added. The diazo was stirred for one hour at about 0° C. to complete diazotization.

37 g. 2-hydroxy-3-carbazolecarboxylic acid p-chloroanilide was dissolved in 100 cc. water and 10 g. NaOH as a 30% solution at 60° C. This was diluted with 500 cc. cold water. This was run into the cold diazo solution. The admixture was stirred well for 2 hours, after which 10 cc. HCl (20° Bé.) was added and the combination boiled for 1 hour, filtered, washed and dried. The resulting brown pigment has the apparent formula:

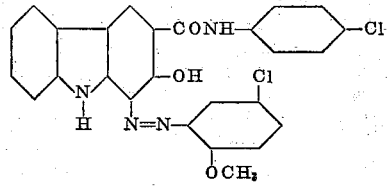

Example 2

5 g. of the pigment prepared as in Example 1 was mixed in a ball mill for 16 hours with 25 g. of a 4% cellulose acetate solution in acetone. 10 g. acetone was added and mixing continued for an additional 30 minutes.

2.4 g. of the above pigment dispersion was mixed well with 100 g. cellulose acetate as a 15% solution in acetone.

A coating was made on colorless cellulose acetate satin and also on spun "Orlon" (at least 75% polyacrylonitrile) material. After drying, a good brown film was produced on the satin and "Orlon" base. These coatings were exposed in a standard Fadeometer for 117 hours and showed practically no fading.

Example 3

A 50% dispersion of the pigment of Example 1 with "Tamol" L (sodium salt of sulfonated naphthalene formaldehyde condensate) is combined with a viscose spinning solution or a cuprammonium spinning solution in the necessary concentration to obtain a 0.5–3% (by weight of fiber) dyeing, dependent on the shade desired, the solution spun and the fiber finished as usual. The resulting brown regenerated cellulose fibers have excellent light fastness properties.

Example 4

30 parts dioctylphthalate (liquid plasticizer) and 120 parts of a copolymer of vinyl chloride and vinyl acetate are mixed in a Werner-Pfleiderer mixer for 1 hour during which time the mass is heated in order to obtain a heavy viscous dope. The pigment of Example 1 in the amount of .5%, based on the weight of the copolymer, is milled in until a homogeneous mass is formed. It is run over a roller mill at 210° F., then cured for 3 minutes at 290° F. to give a brown colored plastic film having excellent light-fastness properties.

This invention has been described with respect to certain preferred embodiments, and various modifications and variations thereof will become obvious to the person skilled in the art. It is to be understood that such modifications and variations are to be included within the spirit and purview of this application and the scope of the appended claims.

We claim:

1. A process for coloring a fiber-forming material selected from the group consisting of synthetic organic polymeric material, cellulose esters, cellulose ethers and regenerated cellulose comprising incorporating therein, in preformed pigment form, a compound of the formula

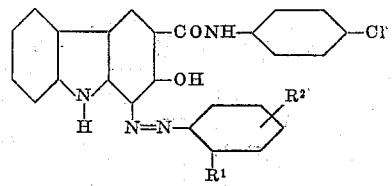

wherein $R^1$ and $R^2$ are selected from the group consisting of Cl, $CH_3$, $OCH_3$, $NO_2$ and $SO_2N(C_2H_5)_2$.

2. A process for coloring fiber-forming synthetic organic polymeric material comprising incorporating therein, in preformed pigment form, a compound of the formula

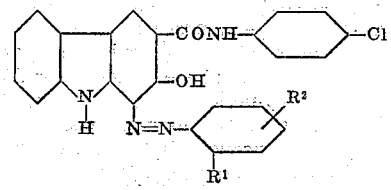

wherein $R^1$ and $R^2$ are selected from the group consisting of Cl, $CH_3$, $OCH_3$, $NO_2$ and $SO_2N(C_2H_5)_2$.

3. A process as defined in claim 2 wherein $R^1$ is $OCH_3$ and $R^2$ is Cl in the 5-position.

4. A process as defined in claim 2 wherein $R^1$ is Cl and $R^2$ is Cl in the 5-position.

5. A process as defined in claim 2 wherein $R^1$ is $CH_3$ and $R^2$ is Cl in the 5-position.

6. A process as defined in claim 2 wherein the material has a basis of cellulose acetate.

7. A process as defined in claim 2 wherein the material has a basis of polyacrylonitrile.

8. A process as defined in claim 2 wherein the material has a basis of a copolymer of vinyl chloride and vinyl acetate.

9. A process as defined in claim 2 wherein the material has a basis of regenerated cellulose.

References Cited in the file of this patent

UNITED STATES PATENTS

| | | |
|---|---|---|
| 1,919,573 | Schmelzer et al. | July 25, 1933 |
| 2,496,255 | Von Glahn | Jan. 31, 1950 |
| 2,701,211 | Taylor et al. | Feb. 1, 1955 |